US012674031B2

(12) United States Patent
Kobayashi et al.

(10) Patent No.: US 12,674,031 B2
(45) Date of Patent: Jul. 7, 2026

(54) HYDROPHILIC GROUP-MODIFIED ORGANOPOLYSILOXANE AND PRODUCTION METHOD THEREOF

(71) Applicant: SHIN-ETSU CHEMICAL CO., LTD., Tokyo (JP)

(72) Inventors: Koichiro Kobayashi, Miyota-machi (JP); Yuichi Mukawa, Tamamura-machi (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 714 days.

(21) Appl. No.: 18/015,173

(22) PCT Filed: Jun. 11, 2021

(86) PCT No.: PCT/JP2021/022387
§ 371 (c)(1),
(2) Date: Jan. 9, 2023

(87) PCT Pub. No.: WO2022/014224
PCT Pub. Date: Jan. 20, 2022

(65) Prior Publication Data

US 2023/0250239 A1 Aug. 10, 2023

(30) Foreign Application Priority Data

Jul. 14, 2020 (JP) ................................ 2020-120470

(51) Int. Cl.
*C08G 77/12* (2006.01)
*C08G 77/20* (2006.01)
*C08G 77/38* (2006.01)
*C08G 77/46* (2006.01)

(52) U.S. Cl.
CPC ............. *C08G 77/38* (2013.01); *C08G 77/12* (2013.01); *C08G 77/20* (2013.01); *C08G 77/46* (2013.01)

(58) Field of Classification Search
None
See application file for complete search history.

(56) References Cited

U.S. PATENT DOCUMENTS 5,118,764 A 6/1992 Ichinohe et al.
2002/0161158 A1 10/2002 Burkhart et al.
2003/0158363 A1 8/2003 Nakanishi
2004/0132951 A1 7/2004 Burkhart et al.
2006/0018935 A1 1/2006 Nishijima et al.
2010/0036062 A1 2/2010 Okawa
2012/0269875 A1 10/2012 Tamura et al.
2014/0364394 A1 12/2014 Tamura et al.
2015/0080480 A1 3/2015 Tamura et al.
2015/0376346 A1 12/2015 Tamura et al.
2016/0052944 A1 * 2/2016 Tamura .................... A61Q 1/08 556/440
2019/0077920 A1 3/2019 Kamei

FOREIGN PATENT DOCUMENTS

CN 104136496 A 11/2014
CN 104136498 A 11/2014
CN 109071822 A 12/2018
JP H02-302438 A 12/1990
JP H07-330907 A 12/1995
JP 2006-176655 A 7/2006
JP 2016-084429 A 5/2016
WO 2002/055588 A1 7/2002
WO 2004/046226 A1 6/2004
WO 2007/135771 A1 11/2007
WO 2011/049248 A1 4/2011
WO 2012/165227 A1 12/2012
WO 2014/104256 A1 7/2014
WO 2014/104257 A1 7/2014

OTHER PUBLICATIONS

Jan. 17, 2023 International Preliminary Report on Patentability issued in International Application No. PCT/JP2021/022387.
Aug. 10, 2021 International Search Report issued in International Patent Application No. PCT/JP2021/022387.
Hu, B. et al., "Bubble Sizes in Agitated Water-Hydrophilic Organic Solvents for Heterogeneous Catalytic Reactions," Ind. Eng. Chem. Res., 2007, vol. 46, pp. 4451-4458.
Jul. 15, 2024 extended Search Report issued in European Patent Application No. 21842427.3.
Mar. 9, 2024 Search Report issued in Chinese Patent Application No. 20180048950.X.

* cited by examiner

*Primary Examiner* — Anthony J Frost
(74) *Attorney, Agent, or Firm* — Oliff PLC

(57) ABSTRACT

A hydrophilic group-modified organopolysiloxane represented by the following general formula (1) containing 0.03 mol % or less of silanol groups at siloxane chain terminals, and 15 ppm or less of propionaldehyde after the organopolysiloxane is mixed with pure water at a mass ratio of 1:1 and mixed at 50° C. for 24 hours. As a result, the present invention provides a hydrophilic group-modified organopolysiloxane having a low silanol content and a low residual amount of acids, neutral salts, etc., as well as a method of producing the hydrophilic group-modified organopolysiloxane by a simpler way than previously-known methods.

$$R^1_aR^2_bSiO_{(4-a-b)/2}. \quad (1)$$

4 Claims, No Drawings

HYDROPHILIC GROUP-MODIFIED ORGANOPOLYSILOXANE AND PRODUCTION METHOD THEREOF

TECHNICAL FIELD

The present invention relates to a hydrophilic group-modified organopolysiloxane and a production method thereof.

BACKGROUND ART

Methods involving a hydrosilylation reaction is one of the useful methods for producing organopolysiloxanes modified with various organic groups. In particular, since organopolysiloxane is hydrophobic, applications to various purposes have been achieved by modifying the hydrophilic group.

Typical hydrophilic groups are polyoxyalkylene groups (polyether groups), and organopolysiloxanes modified with such hydrophilic groups may be produced by a hydrosilylation reaction (addition reaction) of a polyoxyalkylene having allyl groups at the terminals and an organohydrogenpolysiloxane having a hydrosilyl group.

During the addition reaction, the allyl ether in the polyether as the raw material changes into propenyl ether due to rearrangement, and the polyether having propenyl ethers at the terminals is not involved in the addition and remains in the product. When such a product is used for emulsification, which is often used in the manufacture of cosmetics, propionaldehyde is generated due to hydrolysis, thereby causing offensive odors.

To prevent this problem, there is a method of performing an acid treatment after the addition reaction to precipitate and remove the aldehyde in advance, by causing a reaction of the rearranged propenyl group (Patent Document 1). However, this method causes structural destruction by the acid, and also this acid treatment is incapable of decomposing unreacted polyether with allyl ethers at the both terminals (it is hydrolyzed although at a rate slower than propenyl). Therefore, the generation of propionaldehyde over time cannot be completely prevented. In view of solving this problem, a method of performing hydrogenation of the modified oil after the reaction has been known (Patent Document 2).

However, since the reaction is carried out at a high temperature in this method, the unreacted propenyl ether reacts with the terminal hydroxyl groups of the polyether-modified oil as the product or the alcohol commonly used as a solvent, thereby producing acetal as a by-product. This acetal decomposes over time to produce propionaldehyde as well; however, since acetal has no double bond, it cannot be removed by hydrogenation. In addition, it takes a very long time to react it at a low temperature. Therefore, industrial production will be difficult in this way.

As a means for solving this problem, (1) a method of using a low-concentration acid after hydrogenation (Patent Document 3), (2) a method of performing a treatment using a solid acid before and after hydrogenation (Patent Document 4), and (3) a method of removing acetal at a high temperature (Patent Document 5) have been performed. However, since all of these methods are acid treatments or high-temperature treatments, structural destruction is unavoidable. Since such a structural destruction deteriorates the compatibility with raw materials of the cosmetics (which are added at the same time), and since the compatibility is an important factor in the manufacture of cosmetics, a polyether-modified oil free from a silanol group or a hydroxyl group has been demanded.

In addition, in the acid treatment, the acid substance-containing aqueous solution is in the form of a liquid, and the acid substance dissolves into the system; therefore, the acid itself remains in the system. For this reason, neutralization is generally required after the acid treatment; however, this neutral salt also partially remains in the system. That is, there is a problem that acid substances or neutral salts remain in the system. In particular, since polyether-modified polysiloxane is more hydrophilic than dimethylpolysiloxane, acids and neutral salts tend to remain in the system.

CITATION LIST

Patent Literature

Patent Document 1: JP H02-302438 A
Patent Document 2: JP H07-330907 A
Patent Document 3: WO 2002/055588 A1
Patent Document 4: WO 2004/046226 A1
Patent Document 5: JP 2006-176655 A

SUMMARY OF INVENTION

Technical Problem

An object of the present invention is to provide a hydrophilic group-modified organopolysiloxane having a low silanol content and a low residual amount of acids, neutral salts, etc., as well as a method of producing the hydrophilic group-modified organopolysiloxane by a simpler way than previously-known methods.

Solution to Problem

In order to solve the above problem, the present invention provides a hydrophilic group-modified organopolysiloxane represented by the following general formula (1):

$$R^1_aR^2_bSiO_{(4-a-b)/2} \quad (1)$$

wherein $R^1$ is a group selected from alkyl groups having 1 to 30 carbon atoms, aryl groups having 6 to 30 carbon atoms, aralkyl groups having 7 to 30 carbon atoms, and organic groups represented by the following general formula (2):

$$-C_mH_{2m}-O-(C_2H_4O)_c(C_3H_6O)_dR^3 \quad (2)$$

wherein $R^3$ is a group selected from a hydrogen atom, monovalent hydrocarbon groups having 1 to 4 carbon atoms and acyl groups represented by $R^4C(=O)-$, wherein $R^4$ is a monovalent hydrocarbon group having 1 to 30 carbon atoms; "c" is an integer of 2 to 200, "d" is an integer of 0 to 200; and "c+d" is 3 to 200; when a polyoxyalkylene moiety of "c" and "d" comprises both an ethylene oxide unit and a propylene oxide unit, these unit optionally form either a block polymer or a random polymer; and "m" is an integer of 0 to 15 and each $R^1$ is identical to or different from one another; and $R^2$ is a hydrophilic group represented by the following general formula (3):

$$—Q—O—X \quad (3)$$

wherein Q is a divalent hydrocarbon group having 3 to 20 carbon atoms, which optionally contains an ether bond or an ester bond; and X is a monovalent hydrophilic group comprising polyoxyalkylene, glycerin, or sugar; "a" is a number satisfying 1.0≤a≤2.5; and "b" is a number satisfying 0.001≤b≤1.5, the hydrophilic group-modified organopolysiloxane comprising 0.03 mol % or less of silanol groups at siloxane chain terminals, and 15 ppm or less of propionaldehyde after the organopolysiloxane is mixed with pure water at a mass ratio of 1:1 and mixed at 50° C. for 24 hours.

Such a hydrophilic group-modified organopolysiloxane has a low silanol content and a low residual amount of acids, neutral salts, etc.

Further, the organopolysiloxane is preferably a linear organopolysiloxane or branched organopolysiloxane.

The hydrophilic group-modified organopolysiloxane of the present invention may be such a substance.

Further, the hydrophilic group represented by the following general formula (3) is preferably a polyoxyalkylene group represented by the following general formula (4):

$$—Q—O—(C_2H_4O)_e(C_3H_6O)_f—R^5 \quad (4)$$

wherein Q is identical to Q in the general formula (3); $R^3$ is a group selected from a hydrogen atom, monovalent hydrocarbon groups having 1 to 4 carbon atoms and acyl groups represented by $R^4C(=O)—$, wherein $R^4$ is a monovalent hydrocarbon group having 1 to 30 carbon atoms; "e" is an integer of 2 to 200; "f" is an integer of 0 to 200; and "e+f" is 3 to 200; when a polyoxyalkylene moiety in the general formula (4) comprises both an ethylene oxide unit and a propylene oxide unit, these units optionally form either a block polymer or a random polymer.

The hydrophilic group-modified organopolysiloxane of the present invention may contain such a hydrophilic group.

Further, the present invention provides a method for producing a hydrophilic group-modified organopolysiloxane represented by the following general formula (1):

$$R^1_aR^2_bSiO_{(4-a-b)/2} \quad (1)$$

wherein $R^1$ is a group selected from alkyl groups having 1 to 30 carbon atoms, aryl groups having 6 to 30 carbon atoms, aralkyl groups having 7 to 30 carbon atoms, and organic groups represented by the following general formula (2):

$$—C_mH_{2m}—O—(C_2H_4O)_c(C_3H_6O)_dR^3 \quad (2)$$

wherein $R^3$ is a group selected from a hydrogen atom, monovalent hydrocarbon groups having 1 to 4 carbon atoms and acyl groups represented by $R^4C(=O)—$, wherein $R^4$ is a monovalent hydrocarbon group having 1 to 30 carbon atoms; "c" is an integer of 2 to 200; "d" is an integer of 0 to 200; and "c+d" is 3 to 200; when a polyoxyalkylene moiety of "c" and "d" comprises both an ethylene oxide unit and a propylene oxide unit, these units optionally form either a block polymer or a random polymer; and "m" is an integer of 0 to 15 and each $R^1$ is identical to or different from one another; and $R^2$ is a hydrophilic group represented by the following general formula (3):

$$—Q—O—X \quad (3)$$

wherein Q is a divalent hydrocarbon group having 3 to 20 carbon atoms, which optionally contains an ether bond or an ester bond; and X is a monovalent hydrophilic group comprising polyoxyalkylene, glycerin, or sugar; "a" is a number satisfying 1.0≤a≤2.5; "b" is a number satisfying 0.001≤b≤1.5 the method comprising performing a hydrosilylation reaction step of the following component (A) and component (B):

(A) an organohydrogenpolysiloxane having one or more hydrosilyl groups within one molecule represented by the following general formula (5):

$$R^1_aH_gSiO_{(4-a-g)/2} \quad (5)$$

wherein $R^1$ is as defined above; "a" is a number satisfying 1.0≤a≤2.5, and "g" is a number satisfying 0.001≤g≤1.5; and (B) a hydrophilic group-containing organic compound having an alkenyl group at a molecular chain terminal represented by the following general formula (3'):

$$CH_2=CH—Q'—O—X \quad (3')$$

wherein Q' is a divalent hydrocarbon group having 1 to 18 carbon atoms, which optionally contains an ether bond or an ester bond; and X is a monovalent hydrophilic group comprising polyoxyalkylene, glycerin, or sugar, followed by a hydrogenation reaction step using a fine-bubble hydrogen gas.

According to such a method for producing a hydrophilic group-modified organopolysiloxane, a hydrophilic group-modified organopolysiloxane having a low silanol group content and a low propionaldehyde content can be produced by a method simpler than previously-known methods.

Further, as the hydrophilic group-containing organic compound, it is preferable to use a polyoxyalkylene group-containing organic compound represented by the following general formula (4'):

$$CH_2=CH—Q'—O—(C_2H_4O)_e(C_3H_6O)_f—R^5 \quad (4')$$

wherein Q' is identical to Q' in the general formula (3'); $R^5$ is a group selected from a hydrogen atom, monovalent hydrocarbon groups having 1 to 4 carbon atoms, and acyl groups represented by $R^4C(=O)$—, wherein $R^4$ is a monovalent hydrocarbon group having 1 to 30 carbon atoms; "e" is an integer of 2 to 200, "f" is an integer of 0 to 200; and "e+f" is 3 to 200; when a polyoxyalkylene moiety in the general formula (4') comprises both an ethylene oxide unit and a propylene oxide unit, these units optionally form either a block polymer or a random polymer.

Such a polyoxyalkylene group-containing organic compound may be used in the method for producing a hydrophilic group-modified organopolysiloxane of the present invention.

Further, the present invention may also be a method for producing a hydrophilic group-modified organopolysiloxane in which the organohydrogenpolysiloxane of the component (A) is a branched organohydrogenpolysiloxane, and, before or after the hydrosilylation reaction step, a branched chain forming step by a hydrosilylation reaction of a linear organohydrogenpolysiloxane having a hydrosilyl group at a molecular side chain and a linear organopolysiloxane having an alkenyl group at one terminal of a molecular chain is performed.

This method enables efficient production of a branched organohydrogenpolysiloxane as the component (A)

Advantageous Effects of Invention

In the hydrophilic group-modified organopolysiloxane of the present invention, double bonds and aldehyde condensates contained as impurities in the organopolysiloxane are almost completely decomposed, and ketones and aldehydes are removed. Therefore, the hydrophilic group-modified organopolysiloxane of the present invention does not cause odor over time even when it is incorporated in an aqueous composition. Therefore, it can also be used for cosmetic applications for which it could not previously be used.

Further, according to the production method described in the present invention, a hydrophilic group-modified organopolysiloxane having a low silanol group content and a low propionaldehyde content can be easily obtained at a high yield.

DESCRIPTION OF EMBODIMENTS

As described above, provision of a hydrophilic group-modified organopolysiloxane having a low silanol content and a low residual amount of acids, neutral salts, etc., as well as development of a method for producing the hydrophilic group-modified organopolysiloxane by a simpler way than previously-known methods have been demanded.

As a result of intensive studies on the above problems, the inventors of the present invention found that a hydrophilic group-modified organopolysiloxane having a low silanol content and a low residual amount of acids, neutral salts, etc. may be provided by producing a hydrophilic group-modified organopolysiloxane containing 0.03 mol % or less of silanol groups at siloxane chain terminals, and 15 ppm or less of propionaldehyde after the organopolysiloxane is mixed with pure water at a mass ratio of 1:1 and mixed at 50° C. for 24 hours. With this finding, the inventors completed the present invention.

Specifically, the present invention is a hydrophilic group-modified organopolysiloxane represented by the following general formula (1):

$$R^1_aR^2_bSiO_{(4-a-b)/2} \quad (1)$$

wherein $R^1$ is a group selected from alkyl groups having 1 to 30 carbon atoms, aryl groups having 6 to 30 carbon atoms, aralkyl groups having 7 to 30 carbon atoms, and organic groups represented by the following general formula (2):

$$—C_mH_{2m}—O—(C_2H_4O)_c(C_3H_6O)_dR^3 \quad (2)$$

wherein $R^3$ is a group selected from a hydrogen atom, monovalent hydrocarbon groups having 1 to 4 carbon atoms and acyl groups represented by $R^4C(=O)$—, wherein $R^4$ is a monovalent hydrocarbon group having 1 to 30 carbon atoms; "c" is an integer of 2 to 200, "d" is an integer of 0 to 200; and "c+d" is 3 to 200; when a polyoxyalkylene moiety of c and d comprises both an ethylene oxide unit and a propylene oxide unit, these unit optionally form either a block polymer or a random polymer; and "m" is an integer of 0 to 15 and each $R^1$ is identical to or different from one another; and $R^2$ is a hydrophilic group represented by the following general formula (3):

$$—Q—O—X \quad (3)$$

wherein Q is a divalent hydrocarbon group having 3 to 20 carbon atoms, which optionally contains an ether bond or an ester bond; and X is a monovalent hydrophilic group comprising polyoxyalkylene, glycerin, or sugar; "a" is a number satisfying $1.0 \leq a \leq 2.5$; and "b" is a number satisfying $0.001 \leq b \leq 1.5$, the hydrophilic group-modified organopolysiloxane comprising 0.03 mol % or less of silanol groups at siloxane chain terminals, and 15 ppm or less of propionaldehyde after the organopolysiloxane is mixed with pure water at a mass ratio of 1:1 and mixed at 50° C. for 24 hours.

The present invention is described below in detail; however, the present invention is not limited to the examples described below.

Hydrophilic Group-Modified Organopolysiloxane

The hydrophilic group-modified organopolysiloxane of the present invention is represented by the following general formula (1).

$$R^1_aR^2_bSiO_{(4-a-b)/2} \quad (1)$$

Herein, $R^1$ is a group selected from an alkyl group having 1 to 30 carbon atoms, an aryl group having 6 to 30 carbon atoms, and an aralkyl group having 7 to 30 carbon atoms; specific examples include an alkyl group such as a methyl group, an ethyl group, a propyl group, a butyl group, a pentyl group, a hexyl group, a heptyl group, an octyl group, a nonyl group, and a decyl group; a cycloalkyl group such as a cyclopentyl group and a cyclohexyl group; an aryl group such as a phenyl group and a tolyl group; an aralkyl group such as a benzyl group and a phenethyl group; and the like. Examples also include an alkyl group resulting from partial substitution of the above alkyl group with fluorine, such as a trifluoropropyl group and a heptadecafluorodecyl group.

In the formula, R may further be an organic group containing a long-chain alkyl group represented by the following general formula (2).

$$—C_mH_{2m}—O—(C_2H_4O)_c(C_3H_6O)_dR^3 \quad (2)$$

In the formula, $R^3$ is a hydrogen atom, a monovalent hydrocarbon group having 1 to 4 carbon atoms or an acyl group represented by $R^4C(=O)—$, wherein $R^4$ is a monovalent hydrocarbon group having 1 to 30 carbon atoms; "c" is an integer of 2 to 200; "d" is an integer of 0 to 200; "c+d" is 3 to 200; and "m" is an integer of 0 to 15. That is, R is an alkoxy group, an ester group, an alkenyl ether residue or an alkenyl ester residue. Here, regardless of what c and d are, if "m" exceeds 15, the oily smell becomes significant; therefore, "m" is preferably 3 to 11.

"c" is an integer of 2 to 200, preferably 5 to 100; "d" is an integer of 0 to 200, preferably 0 to 100; and "c+d" is 3 to 200, preferably 5 to 100.

When the polyoxyalkylene moiety of the general formula (2) above contains both an ethylene oxide unit and a propylene oxide unit, the moiety optionally forms a block polymer or a random polymer of these units.

In particular, it is preferable that 50% or more, more preferably 70% or more of all R are methyl groups. 100% of R may be methyl groups.

$R^2$ is a hydrophilic group represented by the following general formula (3).

$$—Q—O—X \quad (3)$$

In the formula, Q represents a divalent hydrocarbon group having 3 to 20 carbon atoms that optionally contains an ether bond and an ester bond. Examples include $—(CH_2)_2—$, $—(CH_2)_3—$, $—CH_2CH(CH_3)\ CH_2—$, $—(CH_2)_4—$, $—(CH_2)_5—$, $—(CH_2)_6—$, $—(CH_2)_7—$, $—(CH_2)_8—$, $—(CH_2)_2CH(CH_2CH_2CH_3)—$, $—CH_2CH(CH_2CH_3)—$, $—(CH_2)_3O(CH_2)_2—$, $—(CH_2)_3O(CH_2)_2O(CH_2)_2—$, $—(CH_2)_3OCH_2CH(CH_3)—$, $—CH_2CH(CH_3)COO(CH_2)_2—$ and the like.

X is a monovalent hydrophilic group containing polyoxyalkylene, glycerin, or sugar.

When X is a monovalent hydrophilic group containing polyoxyalkylene, $R^2$ is represented by the following general formula (4).

$$—Q—O—(C_2H_4O)_e(C_3H_6O)_f—R^5 \quad (4)$$

Q in the formula (4) is identical to that in the general formula (3) and $R^5$ is a group selected from a hydrogen atom, monovalent hydrocarbon groups having 1 to 4 carbon atoms and acyl groups represented by $R^4C(=O)—$, wherein $R^4$ is a monovalent hydrocarbon group having 1 to 30 carbon atoms.

"e" is an integer of 2 to 200, preferably 5 to 100, "f" is an integer of 0 to 200, preferably 0 to 100, and "e+f" is 3 to 200, preferably 5 to 100, and preferably satisfies $e/f \geq 1$ to ensure sufficient hydrophilicity to obtain a water-in-oil emulsion.

When the polyoxyalkylene moiety of the general formula (4) above contains both an ethylene oxide unit and a propylene oxide unit, these units optionally form either a block polymer or a random polymer.

When X is a monovalent hydrophilic group containing glycerin, examples of $R^2$ include the following residues (wherein Q is identical to that in the formula (3), and "t" in the formula is an integer of 1 to 20). Also, a part of the hydroxyl groups in the residues below is optionally substituted with an alkoxy group or an ester group.

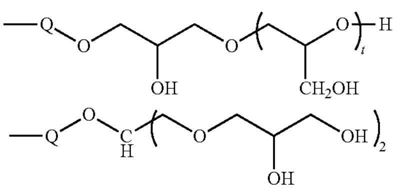

Examples of sugar residues (X) derived from monosaccharides, oligosaccharides or polysaccharides include monosaccharide groups such as a glycosyl group, a mannosyl group, a galactosyl group, a ribosyl group, an arabinosyl group, a xylosyl group and a fructosyl group; oligosaccharide groups such as a maltosyl group, a cellobiosyl group, a lactosyl group and a maltotriosyl group; polysaccharide groups such as cellulose and starch, and the like. Among these, monosaccharide groups and oligosaccharide groups are preferable.

"a" is 1.0 to 2.5, preferably 1.2 to 2.3. If "a" is less than 1.0, the compatibility with the oil solution is poor, making it difficult to obtain a stable water-in-oil emulsion. If "a" is greater than 2.5, the hydrophilicity is poor, also making it difficult to obtain a stable water-in-oil emulsion. "b" is 0.001 to 1.5, preferably 0.05 to 1.0. If "b" is less than 0.001, the hydrophilicity is poor, making it difficult to obtain a stable water-in-oil emulsion. If "b" is greater than 1.5, the hydrophilicity is excessively high, making it difficult to obtain a stable water-in-oil emulsion.

In view of the property as an emulsifier, the weight-average molecular weight of the silicone compound represented by the general formula (1) is, but not particularly limited to, preferably 500 to 200,000, particularly preferably 1,000 to 100,000.

When it is used for a skin cleansing composition, the weight-average molecular weight of the silicone compound represented by the general formula (1) is preferably 4,000 or less, more preferably 2,000 or less, particularly preferably 1,500 or less.

In the present invention, the weight-average molecular weight is a value obtained by Gel Permeation Chromatography (GPC) analysis using polystyrene as a standard material under the following conditions.

Measurement Conditions

Eluent: tetrahydrofuran (THF)

Flow rate: 0.6 mL/min

Detector: differential refractive index detector (RI)

Column: TSK Guardcolumn Super H-H

TSKgel Super HM-N (6.0 mm I.D.×15 cm×1)

TSKgel Super H2500 (6.0 mm I.D.×15 cm×1)

(all manufactured by Tosoh Corporation)

Column temperature: 40° C.

Sample injection amount: 50 μL (THF solution having a concentration of 0.3 wt %)

In addition, the present invention enables industrial production of a hydrophilic group-modified organopolysiloxane containing 0.03 mol % or less of silanol groups at siloxane chain terminals, and 15 ppm or less of propionaldehyde after the organopolysiloxane is mixed with pure water at a mass ratio of 1:1 and mixed at 50° C. for 24 hours.

Method for Producing Hydrophilic Group-Modified Organopolysiloxane

Further, the present invention provides a method for producing a hydrophilic group-modified organopolysiloxane represented by the following general formula (1):

$$R^1_aR^2_bSiO_{(4-a-b)/2} \quad (1)$$

wherein $R^1$ is a group selected from alkyl groups having 1 to 30 carbon atoms, aryl groups having 6 to 30 carbon atoms, aralkyl groups having 7 to 30 carbon atoms, and organic groups represented by the following general formula (2):

$$—C_mH_{2m}—O—(C_2H_4O)_c(C_3H_6O)_dR^3 \quad (2)$$

wherein $R^3$ is a group selected from a hydrogen atom, monovalent hydrocarbon groups having 1 to 4 carbon atoms and acyl groups represented by $R^4C(=O)$—, wherein $R^4$ is a monovalent hydrocarbon group having 1 to 30 carbon atoms; "c" is an integer of 2 to 200; "d" is an integer of 0 to 200; and "c+d" is 3 to 200; when a polyoxyalkylene moiety of "c" and "d" comprises both an ethylene oxide unit and a propylene oxide unit, these units optionally form either a block polymer or a random polymer; and "m" is an integer of 0 to 15 and each $R^1$ is identical to or different from one another; and $R^2$ is a hydrophilic group represented by the following general formula (3):

$$—Q—O—X \quad (3)$$

wherein Q is a divalent hydrocarbon group having 3 to 20 carbon atoms, which optionally contains an ether bond or an ester bond; and X is a monovalent hydrophilic group comprising polyoxyalkylene, glycerin, or sugar; "a" is a number satisfying 1.0≤a≤2.5; "b" is a number satisfying 0.001≤b≤1.5, the method comprising performing a hydrosilylation reaction step of the following component (A) and component (B):

(A) an organohydrogenpolysiloxane having one or more hydrosilyl groups within one molecule represented by the following general formula (5):

$$R^1_aH_gSiO_{(4-a-g)/2} \quad (5)$$

wherein $R^1$ is as defined above; "a" is a number satisfying 1.0≤a≤2.5, and "g" is a number satisfying 0.001≤g≤1.5; and (B) a hydrophilic group-containing organic compound having an alkenyl group at a molecular chain terminal represented by the following general formula (3'):

$$CH_2{=}CH—Q'—O—X \quad (3')$$

wherein Q' is a divalent hydrocarbon group having 1 to 18 carbon atoms, which optionally contains an ether bond or an ester bond; and X is a monovalent hydrophilic group comprising polyoxyalkylene, glycerin, or sugar, followed by a hydrogenation reaction step using a fine-bubble hydrogen gas.

The silicone compound represented by the general formula (1) above used in the present invention may be easily synthesized by an addition reaction (hydrosilylation reaction) of, as component (A), an organohydrogenpolysiloxane having one or more hydrosilyl groups within one molecule represented by the following general formula (5), and, as component (B), an alkenylated polyoxyalkylene compound, alkenylated glycerin compound, alkenylated sugar compound represented by the following general formula (3'), optionally with an alkylene compound and/or an organic compound represented by the following general formula (6) in the presence of a platinum catalyst or a rhodium catalyst.

$$R^1_aH_gSiO_{(4-a-g)/2} \quad (5)$$

(wherein $R^1$ is as defined above, "a" is a number satisfying 1.0≤a≤2.5, and "g" is a number satisfying 0.001≤g≤1.5)

$$CH_2{=}CH—Q'—O—X \quad (3')$$

(wherein Q' is a divalent hydrocarbon group having 1 to 18 carbon atoms, which optionally contains an ether bond or an ester bond; and X is a monovalent hydrophilic group containing polyoxyalkylene, glycerin, or sugar)

$$C_mH_{(2m-1)}—O—(C_2H_4O)_c(C_3H_6O)_d—R^3 \quad (6)$$

(wherein $R^3$, "c" and "d" are as defined above)

Examples of the polyoxyalkylene compound include, among low molecular weight compounds such as ethyleneglycol monoallylether {2-(allyloxy)ethanol}, a compound having a high molecular weight, such as those represented by the following formulae.

$CH_2{=}CHCH_2—O—(C_2H_4O)_{10}—H$ $CH_2{=}CHCH_2—O—(C_2H_4O)_{22}(C_3H_6O)_{22}—C_4H_5$ $CH_2{=}CHCH_2(CH_2)_8—O—(C_2H_4O)_{21}(C_3H_6O)_7—H$

Examples of the glycerin compounds include monoglycerin, diglycerin, polyglycerin including triglycerin, and alkyl esters thereof. Specific examples include those having the following structures.

$CH_2{=}CHCH_2—O—CH_2CH(OH)CH_2OH$ $CH_2{=}CHCH_2—O—(CH_2CH(CH_2OH)O)_2H$ $CH_2{=}CHCH_2—O—CH_2CH(OH)CH_2O(CH_2CH(CH_2OH)O)_2H$ $CH_2{=}CHCH_2—O—CH(CH_2OCH_2CH(OH)CH_2OH)_2$

Further, examples of the sugar compounds include allylated monosaccharides such as α-allylglucoside, β-glucoside and mixtures thereof, and allylated disaccharides and polysaccharides and mixtures thereof.

The organohydrogenpolysiloxane used herein may be any of a linear, branched, or cyclic organohydrogenpolysiloxane; however, mainly, a linear organohydrogenpolysiloxane is preferable in terms of facilitation of the addition reaction. The total mixing ratio of the organohydrogenpolysiloxane and the above polyoxyalkylene compound, glycerin compound, sugar compound, alkylene compound and/or the organic compound represented by the above general formula (6) is, in terms of the molar ratio of the hydrosilyl groups to the terminal unsaturated groups, 0.5 to 2.0, preferably 0.8 to 1.2.

Further, as the hydrophilic group-containing organic compound, it is possible to use a polyoxyalkylene group-containing organic compound represented by the following general formula (4'):

$$CH_2{=}CH{-}Q'{-}O{-}(C_2H_4O)_e(C_3H_6O)_f{-}R^5 \qquad (4')$$

wherein Q' is identical to Q' in the general formula (3'); $R^5$ is a group selected from a hydrogen atom, monovalent hydrocarbon groups having 1 to 4 carbon atoms, and acyl groups represented by $R^4C(=O)$—, wherein $R^4$ is a monovalent hydrocarbon group having 1 to 30 carbon atoms; "e" is an integer of 2 to 200, "f" is an integer of 0 to 200; and "e+f" is 3 to 200; when a polyoxyalkylene moiety in the general formula (4') comprises both an ethylene oxide unit and a propylene oxide unit, these units optionally form either a block polymer or a random polymer.

In addition, the component (A) may be a branched organohydrogenpolysiloxane, and it is possible to perform a branched chain forming step by a hydrosilylation reaction between a linear organohydrogenpolysiloxane having a hydrosilyl group at a molecular side chain and a linear organopolysiloxane having an alkenyl group at one terminal of the molecular chain before or after the above hydrosilylation reaction step.

The addition reaction described above is desirably carried out in the presence of a platinum catalyst or a rhodium catalyst. Specifically, chloroplatinic acid, alcohol-modified chloroplatinic acid, chloroplatinic acid-vinyl siloxane complex and the like are preferably used. The amount of the catalyst to be used can be a catalytic amount, and is particularly 50 ppm or less, preferably 20 ppm or less in terms of platinum or rhodium content.

The above addition reaction may be carried out in an organic solvent as necessary. Examples of the organic solvents include aliphatic alcohols such as methanol, ethanol, 2-propanol and butanol; aromatic hydrocarbons such as toluene and xylene; aliphatic or alicyclic hydrocarbons such as n-pentane, n-hexane and cyclohexane; and halogenated hydrocarbons such as dichloromethane, chloroform and carbon tetrachloride; and the like. Among these, ethanol and 2-propanol (isopropyl alcohol) are preferable particularly for the cosmetic applications. The conditions of the addition reaction are not particularly limited; however, the addition reaction is preferably carried out under reflux for 1 to 10 hours.

During the above step, especially when the addition reaction is carried out in the presence of a platinum catalyst, internal rearrangement of the terminal double bonds of the alkylene compound occurs, and, for example, in the case of a polyoxyalkylene allyl-etherified at the terminals, propenyl-etherified polyoxyalkylene (propenyl-etherified polyether) is produced. Even if hydrogen siloxane is used in an amount more than the amount that naturally reacts with the polyoxyalkylene containing terminal double bonds, since the normal addition reaction and the isomerization reaction of the polyoxyalkylene occur at the same time, the formation of polyethers containing internal double bonds by the isomerization is inevitable. Also, as is known in silicone chemistry research, polyethers containing internal double bonds do not react with hydrogen siloxane and always remain in the system. Therefore, polyethers containing terminal and internal double bonds always remain in the previously-known polyether-modified silicones synthesized in the presence of a platinum catalyst, and the degree of unsaturation of the entire system has been 0.02 or more.

The acidity/alkalinity of polyether-modified silicone becomes acidic over time due to oxidation degradation of polyether. Therefore, when a polyether-modified silicone is incorporated into aqueous cosmetics, the system becomes acidic, and the decomposition of the propenyl-etherified polyether gradually advances due to the influence of an aqueous solution having a pH of 7 or less, thereby generating propionaldehyde causing offensive odors. Because of the offensive odors thus generated over time, there have been difficulties in incorporating a large amount of polyether-modified silicone in cosmetics, such as hair care products, skin care products, and makeup products. In particular, it has been difficult to incorporate it in skin care products and makeup cosmetics that are applied near the nose.

Therefore, by removing the unsaturated groups by a hydrogenation treatment, the amount of propionaldehyde generated due to the unsaturated groups can be reduced. Thus, elimination of the odor was possible to some extent. However, since the hydrogenation reaction is carried out at a high temperature, i.e., 100° C. or higher for a long period of time, acetal (aldehyde condensates), which is formed by condensation of a part of aldehyde, is produced as a by-product. Since acetal remains in the system even after the treatment, it was not possible to remove the odor caused by the aldehyde compound generated by the decomposition of acetal. In addition, when an acid treatment is performed after the hydrogenation, although such aldehyde condensates can be decomposed and removed, there still are many industrial problems such as generation of silanol groups due to cleavage of the silicone main chain due to the acid treatment, installation of corrosion resistance equipment required for the acid treatment, and the like.

In order to solve such inconveniences, in the present invention, fine bubbles of hydrogen are blown into the reaction solution after the addition reaction, making it possible to carry out the hydrogenation reaction at a low temperature. Since no acetal is generated at a low temperature, an acid treatment as a post-process is not required. Thus, omitting the acid treatment not only eliminates the generation of odor due to oxidation of the polyether-modified polysiloxane, but also eliminates the generation of silanol groups due to partial cleavage of the siloxane chains in the silicone oil caused by the acid treatment. As a result, polyether-modified polysiloxane with a very small amount of impurities can be obtained.

Fine bubbles referred to herein are a general term for microbubbles with a particle size of 50 microns or less and nanobubbles with a particle size of 1 micron or less. In recent years, such fine bubbles have been used for the prevention of generation of red tide, preservation of live fish during ocean fishing while protecting it from oxidation by using nitrogen bubbles, semiconductor surface cleaning, and the like. There are various fine bubble generation methods, including a pressurization dissolution method, a rotational flow method, and a micropore method. Any of these methods may be used in the present invention.

Fine bubbles can exist in liquids for a long time due to their fine particle size, and they have a large surface area per unit volume and dissolve quickly in the reaction solution. Since, as a result, hydrogen consumed by the reaction in the liquid can be replenished quickly, the hydrogenation reaction can be carried out in a state where the hydrogen concentration in the liquid is always high. As a result, it becomes possible to achieve a sufficient reaction rate even at a low temperature.

Examples of the hydrogenation catalyst used in the present invention include any catalysts generally used for a hydrogenation reaction, for example, metals such as Ni, Pd, and Pt, activated carbons supporting these metals, silica, solution-type platinum catalysts neutralized by adding vinyl silicone to chloroplatinic acid, and the like.

These catalysts can be used alone, or in combination. Most preferred is Raney nickel, which is economically advantageous.

The hydrogenation reaction is generally carried out at 1 to 100 MPa and 100 to 200° C.; however, if fine bubbles are used, the reaction can be completed at a low temperature, i.e., about 60° C. and 0.6 MPa for 4 hours. Since no acetal is formed at such a temperature, an acid treatment is not necessary.

The hydrogenation reaction may be either a batch-wise reaction or a continuous reaction. In the case of a batch-wise reaction, the reaction time depends on the amount of catalyst; however, a reaction at 60° C. for about 4 to 6 hours is sufficient. There are several methods for generating fine bubbles, such as a gas phase dispersion method by shearing a liquid flow, a method by cavitation, and a method using the difference in solubility of gas in the liquid. Any of these generation methods can be used; however, since it is desirable to increase the amount of hydrogen gas dissolved in the liquid by increasing the pressure, a gas phase dispersion method by shearing a liquid flow, specifically a rotational flow method or a micropore method, is preferred.

The rotational flow method uses a phenomenon in which, when hydrogen gas is supplied from outside to the portion where the liquid flows, due to the ejector effect, the hydrogen mixes with the liquid and finely disperses in the liquid. The gas-liquid ratio herein is preferably 1/100 to 1/1, more preferably 1/5 to 1/50.

The micropore method is a method in which oil is supplied to the inside of a ceramic tube having fine pores, and hydrogen gas is supplied from outside of the ceramic tube at the same time to generate fine bubbles in the liquid. The gas-liquid ratio in this method is preferably 1/500 to 1/5, more preferably 1/100 to 1/50.

The bubble size is determined by the liquid viscosity, linear velocity, gas-liquid ratio, and the like.

Since polyether-modified silicones absorb oxygen in the air in a way similar to that of cosmetic fats and oils, it gradually undergoes autoxidation and deteriorates, thus causing rancidity. Rancidity is a phenomenon that causes an aldehyde odor of acetaldehyde or the like and an acid odor of acetic acid or the like, and thereby causes offensive odors. Therefore, by using antioxidants such as phenols, hydroquinones, benzoquinones, aromatic amines, and vitamins as additives for suppressing oxidation, it is possible to increase stability against oxidation. Examples of such antioxidants include BHT (dibutylhydroxytoluene), vitamin E (d-δ-tocopherol), and the like. Vitamin E is preferable for use in cosmetics, especially skin care products. Herein, the amount of the antioxidant to be added is 10 to 500 ppm, preferably 50 to 300 ppm, relative to the polyether-modified silicone.

EXAMPLE

The present invention is explained further in detail below with reference to Examples; however, the present invention is not limited to the Examples. In the following general formula, the $Me_3SiO_{1/2}$ group is denoted by M, and the $Me_2SiO_{2/2}$ group is denoted by D, wherein Me represents a methyl group, and the siloxane units resulting from modification of the methyl groups in M and D with other substituents are denoted by $M^R$ and $D^R$. Moreover, "%" of the yield means"by mass". Further, in the following examples, the hydrogen gas generation amount is an amount of gas generated at 25° C., measured by the following method.

2 g of a sample is diluted with 5 ml of 1-butanol, and 10 ml of 20 mass % sodium hydroxide aqueous solution is added, followed by vigorous stirring. The generated hydrogen gas was quantified using a gas buret, and the hydrogen gas generation amount was calculated according to the following formula.

Hydrogen gas generation amount (ml/g)=[amount of hydrogen gas (ml) quantified using a gas buret]/[amount of sample (g)]

The particle size of fine bubbles was measured as follows.

Particle Size Measurement Method

Measuring instrument: SALD 7500nano (Shimadzu Corporation)

Measurement principle: laser X-ray diffraction scattering method

Measurement range: 0.007 to 800 μm

Light source: semiconductor laser (wavelength=405 nm)

Detector: 84 elements

Sample: the sample was placed in a batch cell and measured

Example 1

[Polyether-Modified Polysiloxane]

605 g of a methylhydrogenpolysiloxane compound having a hydrogen gas generation amount of 14.0 ml/g and a weight-average molecular weight of 5,000, 195 g of polyoxyethylene(9)allylether, and 200 g of isopropyl alcohol were placed in a glass reaction vessel, and 0.2 g of a 3 mass %-chloroplatinic acid/isopropyl alcohol solution was added thereto, followed by an addition reaction at 80° C. for 5 hours. After transferring the reaction solution to an autoclave, 25 g of Raney nickel was added, and hydrogen was introduced at a gas-liquid ratio of 1/20 while circulating the reaction solution with a bubble generator using a micropore method, thereby performing a hydrogenation reaction at 60° C. for 4 hours. The hydrogen pressure was kept at 0.6 MPa during the reaction. A metal gauze that does not allow Raney nickel to pass through was installed in front of the bubble generator to prevent Raney nickel from entering the circulation line.

The catalyst was filtered, and 0.14 g of vitamin E was added to the reaction solution, followed by distillation under reduced pressure (110° C. or less/400 Pa) and then filtration, thereby obtaining 860 g of oil-like organopolysiloxane represented by a general formula: $M_2D_{60}D^R_3$ (R; $—C_3H_6O(C_2H_4O)_9H$) having a kinematic viscosity of 780 $mm^2/s$ at 25° C. and a specific gravity of 1.009. The yield was 86%.

The above measurement method was performed by adding hydrogen bubbles to the liquid of Example 1 for 20 minutes without adding nickel. After allowing it to stand at normal temperature and normal pressure for 4 hours, the bubbles in the liquid were measured, with the results that the bubble diameter was 0.5 to 3 μm, the average diameter was 0.8 μm, and the standard deviation was 0.162.

Example 2

[Glycerin-Modified Polysiloxane]

360 g of a methylhydrogenpolysiloxane compound having a hydrogen gas generation amount of 21.9 ml/g and a weight-average molecular weight of 2,300, 54 g of polyoxyglycerin(3)allylether, and 243 g of isopropyl alcohol were placed in a glass reaction vessel, and 0.1 g of a 3 mass %-chloroplatinic acid/isopropyl alcohol solution was added thereto, followed by a reaction at 80° C. for 2 hours. Thereafter, 153 g of dimethylpolysiloxane containing a vinyl group at one terminal having a weight-average molecular weight of 700 and 0.1 g of the above platinum catalyst were added to the reaction solution, followed by an addition reaction at 80° C. for 2 hours. After transferring the reaction solution to an autoclave, 24 g of Raney nickel was added, and hydrogen was introduced at a gas-liquid ratio of 1/20 while circulating the reaction solution with a bubble generator using a micropore method, thereby performing a hydrogenation reaction at 60° C. for 5 hours. The hydrogen pressure was kept at 0.6 MPa during the reaction.

The catalyst was filtered, followed by distillation under reduced pressure (110° C. or less/400 Pa) and then filtration, thereby obtaining 459 g of oil-like organopolysiloxane represented by a general formula: $M_2D_{27}D^{R1}D^{R2}$ having a viscosity of 4,000 $mm^2/s$ at 25° C. and a specific gravity of 0.981. The yield was 81%.

$R^1$; $—C_3H_6O(CH_2CH(OH)CH_2O)_3H$ $R^2$; $—(OSi(CH_3)_2)_8OSi(CH_3)_3$

Comparative Example 1

The hydrogenation reaction performed in Example 1 was carried out at 0.6 MPa, 120° C. for 5 hours without using fine bubbles. Thereafter, the catalyst was filtered and 0.14 g of vitamin E was added to the reaction solution obtained in Example 1, then, after stripped under reduced pressure at 110° C./400 Pa, followed by filtration, a sample of Comparative Example 1 was obtained.

Comparative Example 2

After the hydrogenation reaction and the filtration of the catalyst in Comparative Example 1, an aqueous hydrochloric acid solution was added to the reaction solution so that the hydrochloric acid concentration was 20 ppm. Then, after a treatment at 40 to 50° C. for 3 hours, sodium bicarbonate was added in 1.2 fold molar amount relative to hydrochloric acid and the mixture was treated at the same temperature for 30 minutes. Thereafter, 0.14 g of vitamin E was added to the reaction solution, which was then distilled off under reduced pressure (110° C. or less/400 Pa), followed by filtration, thereby obtaining a sample of Comparative Example 2.

Comparative Example 3

The hydrogenation reaction performed in Example 2 was carried out at 0.8 MPa, 90 to 100° C. for 5 hours without using fine bubbles. Thereafter, the catalyst was filtered. Then, after stripped under reduced pressure at 110° C./400 Pa as in Example 2, the sample was filtrated to obtain a sample of Comparative Example 3.

The polysiloxanes obtained in Examples 1 and 2 and Comparative Examples 1, 2 and 3 were subjected to the following measurements.

Odor: 10 g of the sample was mixed with 10 g of purified water, allowed to stand at 60° C. for 24 hours and then examined.

Amount of propionaldehyde: a mixture of 0.5 g of the sample and 0.5 g of water was placed in a 5 mL vial, heated at 50° C. for 24 hours, followed by headspace gas chromatography analysis, and the amount of the generated propionaldehyde was measured.

Amount of silanol group: the amount was calculated from the peak at a chemical shift −15 ppm in $^{29}$Si-NMR (mol % is a value when trimethylsilyl group is 2).

The results were shown in Table 1.

TABLE 1

| | Odor | Propionaldehyde (ppm) | Silanol Group Content (mol %) |
|---|---|---|---|
| Example 1 | None | 1 | N.D. |
| Example 2 | None | 1 | N.D. |
| Comparative Example 1 | Irritant Odor of Aldehyde | 20 | N.D. |
| Comparative Example 2 | None | 1 | 0.1 |
| Comparative Example 3 | Almost None | 24 | N.D. |

N.D. . . . Less Than Detection Limit

According to the above results, the hydrophilic group-modified organopolysiloxane of the present invention has a low silanol group content and a low propionaldehyde content as in Examples 1 and 2. On the other hand, when hydrogenation is performed at a high temperature without using fine bubbles as in Comparative Examples 1 and 3, the aldehyde amount was large and the odor was strong. In Comparative Example 2 in which an acid treatment was performed thereafter, even though the odor was reduced, cleavage of siloxane bonds and structural destruction of the polyether-modified oil occurred; as a result, the silanol group content increases, and compatibility as a raw material for cosmetics deteriorates.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A hydrophilic group-modified organopolysiloxane represented by the following general formula (1):

$$R^1_aR^2_bSiO_{(4-a-b)/2} \quad (1)$$

wherein $R^1$ is a group selected from alkyl groups having 1 to 30 carbon atoms, aryl groups having 6 to 30 carbon atoms, aralkyl groups having 7 to 30 carbon atoms, and organic groups represented by the following general formula (2):

$$—C_mH_{2m}—O—(C_2H_4O)_c(C_3H_6O)_dR^3 \quad (2)$$

wherein $R^3$ is a group selected from a hydrogen atom, monovalent hydrocarbon groups having 1 to 4 carbon atoms and acyl groups represented by $R^4C(=O)—$,
wherein $R^4$ is a monovalent hydrocarbon group having 1 to 30 carbon atoms; "c" is an integer of 2 to 200; "d" is an integer of 0 to 200; and "c+d" is 3 to 200; when a polyoxyalkylene moiety of "c" and "d" comprises both an ethylene oxide unit and a propylene oxide unit, these units optionally form either a block polymer or a random polymer; and "m" is an integer of 0 to 15
and each $R^1$ is identical to or different from one another; and $R^2$ is a hydrophilic group represented by the following general formula (3):

$$—Q—O—X \quad (3)$$

wherein Q is a divalent hydrocarbon group having 3 to 20 carbon atoms, which optionally contains an ether bond or an ester bond; and X is a monovalent hydrophilic group comprising polyoxyalkylene, glycerin, or sugar; "a" is a number satisfying $1.0 \leq a \leq 2.5$; and "b" is a number satisfying $0.001 \leq b \leq 1.5$,
the hydrophilic group-modified organopolysiloxane comprising 0.03 mol % or less of silanol groups at siloxane chain terminals, and 15 ppm or less of propionaldehyde after the organopolysiloxane is mixed with pure water at a mass ratio of 1:1 and mixed at 50° C. for 24 hours.

2. The hydrophilic group-modified organopolysiloxane according to claim 1, wherein the organopolysiloxane is a linear or branched organopolysiloxane.

3. The hydrophilic group-modified organopolysiloxane according to claim 1, wherein the hydrophilic group represented by the general formula (3) is a polyoxyalkylene group represented by the following general formula (4):

$$—Q—O—(C_2H_4O)_e(C_3H_6O)_f—R^5 \quad (4)$$

wherein Q is identical to Q in the general formula (3); $R^5$ is a group selected from a hydrogen atom, monovalent hydrocarbon groups having 1 to 4 carbon atoms and acyl groups represented by $R^4C(=O)—$,
wherein $R^4$ is a monovalent hydrocarbon group having 1 to 30 carbon atoms; "e" is an integer of 2 to 200; "f" is an integer of 0 to 200; and "e+f" is 3 to 200; when a polyoxyalkylene moiety in the general formula (4) comprises both an ethylene oxide unit and a propylene oxide unit, these units optionally form either a block polymer or a random polymer.

4. The hydrophilic group-modified organopolysiloxane according to claim 2, wherein the hydrophilic group represented by the general formula (3) is a polyoxyalkylene group represented by the following general formula (4):

$$—Q—O—(C_2H_4O)_e(C_3H_6O)_f—R^5 \quad (4)$$

wherein Q is identical to Q in the general formula (3); $R^5$ is a group selected from a hydrogen atom, monovalent hydrocarbon groups having 1 to 4 carbon atoms and acyl groups represented by $R^4C(=O)—$,
wherein $R^4$ is a monovalent hydrocarbon group having 1 to 30 carbon atoms; "e" is an integer of 2 to 200; "f" is an integer of 0 to 200; and "e+f" is 3 to 200; when a polyoxyalkylene moiety in the general formula (4) comprises both an ethylene oxide unit and a propylene oxide unit, these units optionally form either a block polymer or a random polymer.

* * * * *